(12) United States Patent  
Bergman et al.

(10) Patent No.: US 9,143,987 B2  
(45) Date of Patent: Sep. 22, 2015

(54) LOAD-INVARIANT CONFIGURATION OF INTERFERENCE MEASUREMENT RESOURCES

(71) Applicant: Telefonaktiebolaget L M Ericsson (publ), Stockholm (SE)

(72) Inventors: Svante Bergman, Hägersten (SE); David Hammarwall, Vallentuna (SE); George Jöngren, Sundbyberg (SE); Niklas Wernersson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 316 days.

(21) Appl. No.: 13/883,706

(22) PCT Filed: Jan. 14, 2013

(86) PCT No.: PCT/SE2013/050018  
§ 371 (c)(1),  
(2) Date: May 6, 2013

(87) PCT Pub. No.: WO2014/058372  
PCT Pub. Date: Apr. 17, 2014

(65) Prior Publication Data  
US 2014/0112248 A1  Apr. 24, 2014

Related U.S. Application Data

(60) Provisional application No. 61/711,518, filed on Oct. 9, 2012.

(51) Int. Cl.  
*G01R 31/08* (2006.01)  
*H04W 28/18* (2009.01)  
(Continued)

(52) U.S. Cl.  
CPC ............... *H04W 28/18* (2013.01); *H04B 7/024* (2013.01); *H04B 17/24* (2015.01); *H04B 7/063* (2013.01); *H04B 7/066* (2013.01); *H04B 7/0632* (2013.01); *H04B 7/0639* (2013.01)

(58) Field of Classification Search  
None  
See application file for complete search history.

(56) References Cited

U.S. PATENT DOCUMENTS

2013/0250788 A1* 9/2013 Kim et al. ............... 370/252  
2013/0301450 A1* 11/2013 Geirhofer et al. ....... 370/252  
(Continued)

OTHER PUBLICATIONS

Author Unknown, "Details of Aperiodic CSI Triggering", NEC Group; 3GPP TSG RAN WG1 Meeting #70bis; R1-124289. Oct. 8-12, 2012. pp. 1-5. San Diego, California, US.

(Continued)

*Primary Examiner* — Phirin Sam  
(74) *Attorney, Agent, or Firm* — Murphy, Bilak & Homiller, PLLC

(57) ABSTRACT

According to one aspect of this disclosure, the configuration of which Interference Measurement Resources, "IMRs", a given user equipment, "UE", should measure for Channel State Information, "CSI", reporting is made more or less invariant to dynamic traffic variations affecting the set of Coordinated Multi-Point, "CoMP", transmission points used for serving the UE, or to the use of dynamic blanking for those transmission points. These goals are achieved at least in part by configuring one or more of the transmission points to follow a first rule embodying a negative logic. According to the first rule, the transmission point transmits on a given IMR if it has been deemed as being not likely to transmit data at a time relevant to the IMR, and, conversely, to not transmit the IMR if it has been deemed as being likely to transmit data at a time relevant to the IMR.

25 Claims, 11 Drawing Sheets

(51) Int. Cl.
*H04B 7/02* (2006.01)
*H04B 17/24* (2015.01)
*H04B 7/06* (2006.01)

(56) References Cited

U.S. PATENT DOCUMENTS

2013/0301542 A1* 11/2013 Krishnamurthy et al. .... 370/329
2013/0336214 A1* 12/2013 Sayana et al. ................. 370/328
2014/0038623 A1* 2/2014 Davydov et al. .............. 455/450
2014/0045510 A1* 2/2014 Yue et al. ....................... 455/450

OTHER PUBLICATIONS

Author Unknown, "Interference Measurement Resource for Downlink CoMP", Samsung. 3GPP TSG RAN WG1 #68bis; R1-121627. Mar. 26-30, 2012. pp. 1-5. Jeju, Korea.

Author Unknown, "Maximum Number of CSI Processes", NEC Group; 3GPP TSG RAN WG1 Meeting #70bis; R1-124290. Oct. 8-12, 2012. pp. 1-4. San Diego, California, US.

Author Unknown, "Remaining Topics of CoMP CQI and Associated CSI Process Definitions", Ericsson, ST-Ericsson; 3GPP TSG-RAN WG1 #70; R1-123828. Aug. 13-17, 2012. pp. 1-6. Qingdao, China.

* cited by examiner

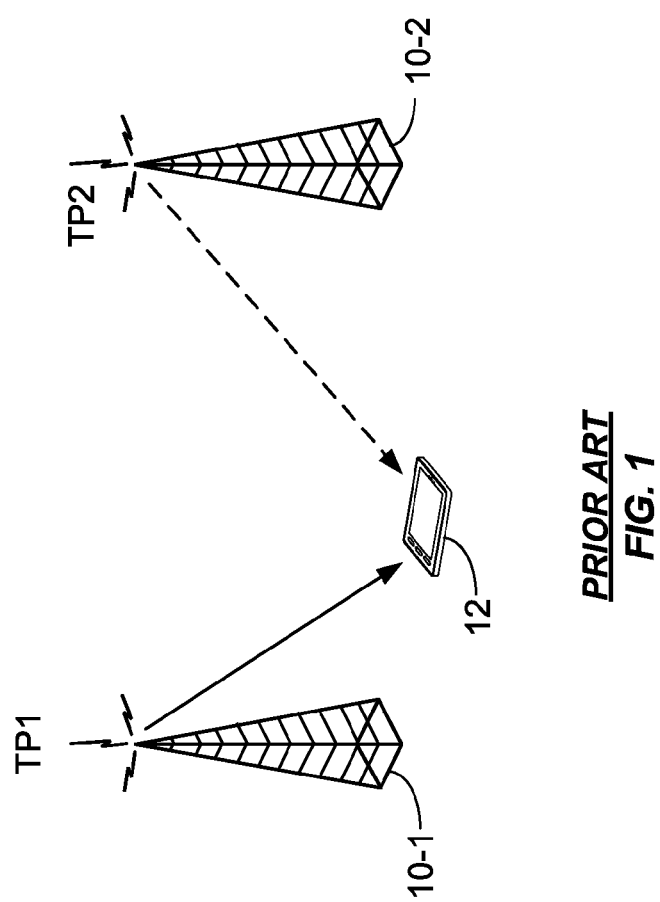
| IMR | TP1 | TP2 |
|---|---|---|
| 1 | 0 | 0 |
| 2 | 0 | 1 |
| 3 | 1 | 0 |
*PRIOR ART*
*FIG. 2*
*PRIOR ART*
*FIG. 1*

| IMR | TP1 | TP2 | TP3 |
|---|---|---|---|
| 1 | 0 | D2 | D3 |
| 2 | D1 | 0 | D3 |
| 3 | D1 | D2 | 0 |
| 4 | 0 | 0 | D3 |
| 5 | D1 | 0 | 0 |
| 6 | 0 | D2 | 0 |
| 7 | 0 | 0 | 0 |

*PRIOR ART*
*FIG. 3*

| IMR | TP1 | TP2 | TP3 |
|---|---|---|---|
| 1 | 0 | 1 | 1 |
| 2 | 1 | 0 | 1 |
| 3 | 1 | 1 | 0 |
| 4 | 0 | 0 | 1 |
| 5 | 1 | 0 | 0 |
| 6 | 0 | 1 | 0 |
| 7 | 0 | 0 | 0 |

*PRIOR ART*
*FIG. 4*

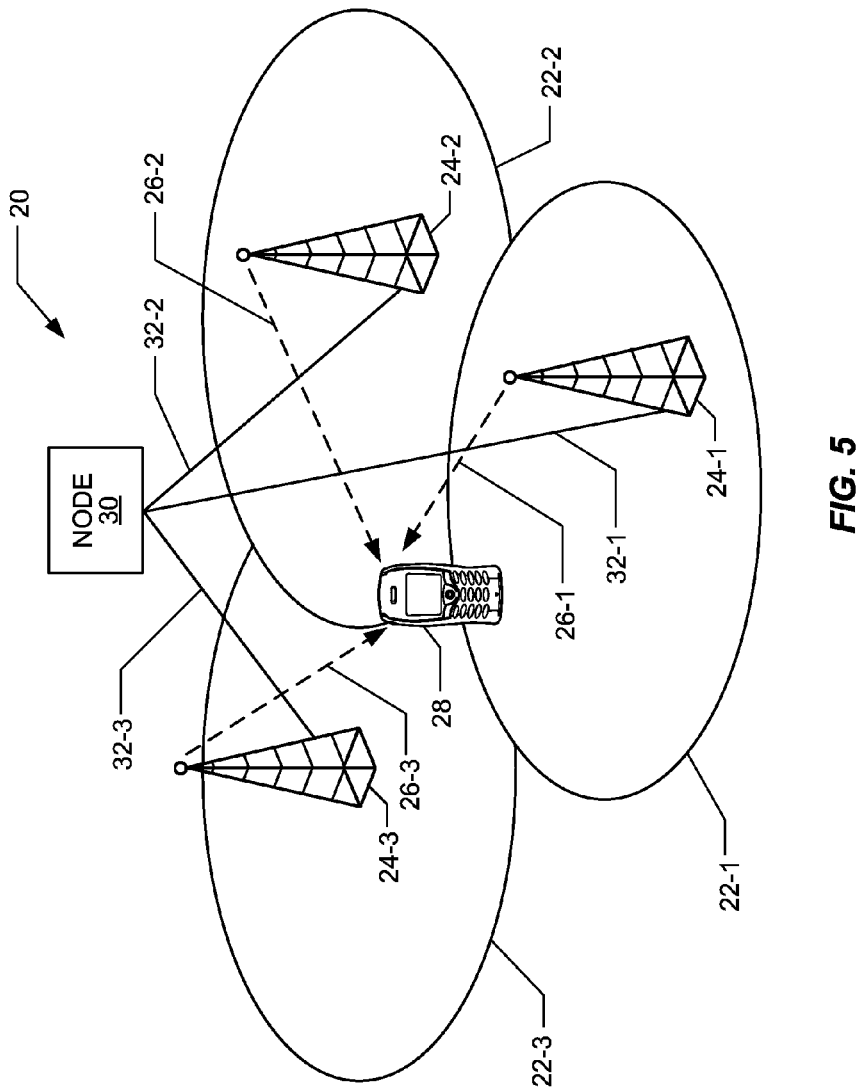
FIG. 5

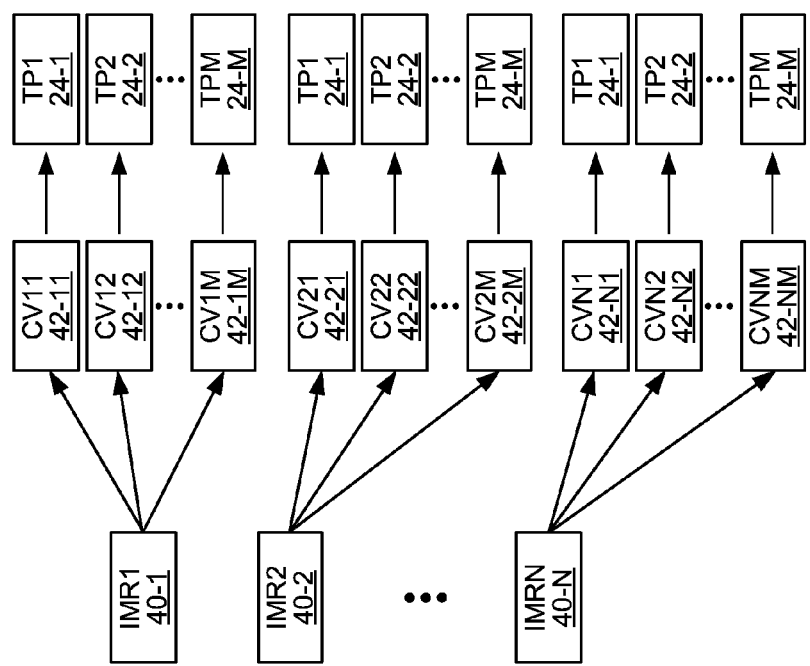
FIG. 6A

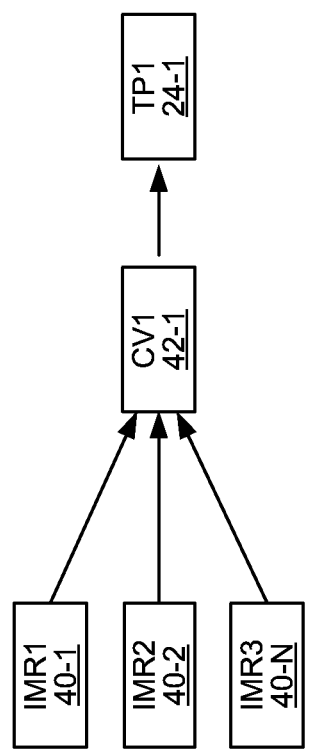
FIG. 6B

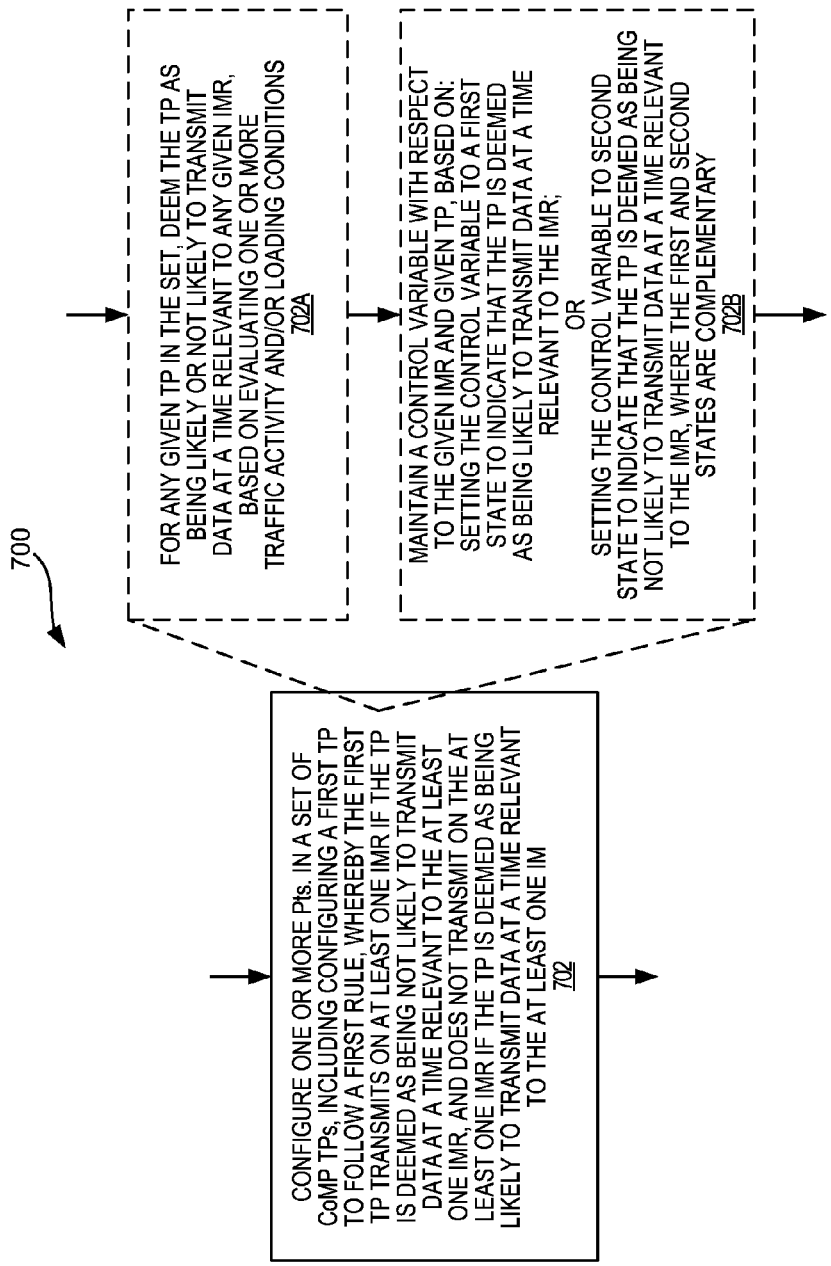

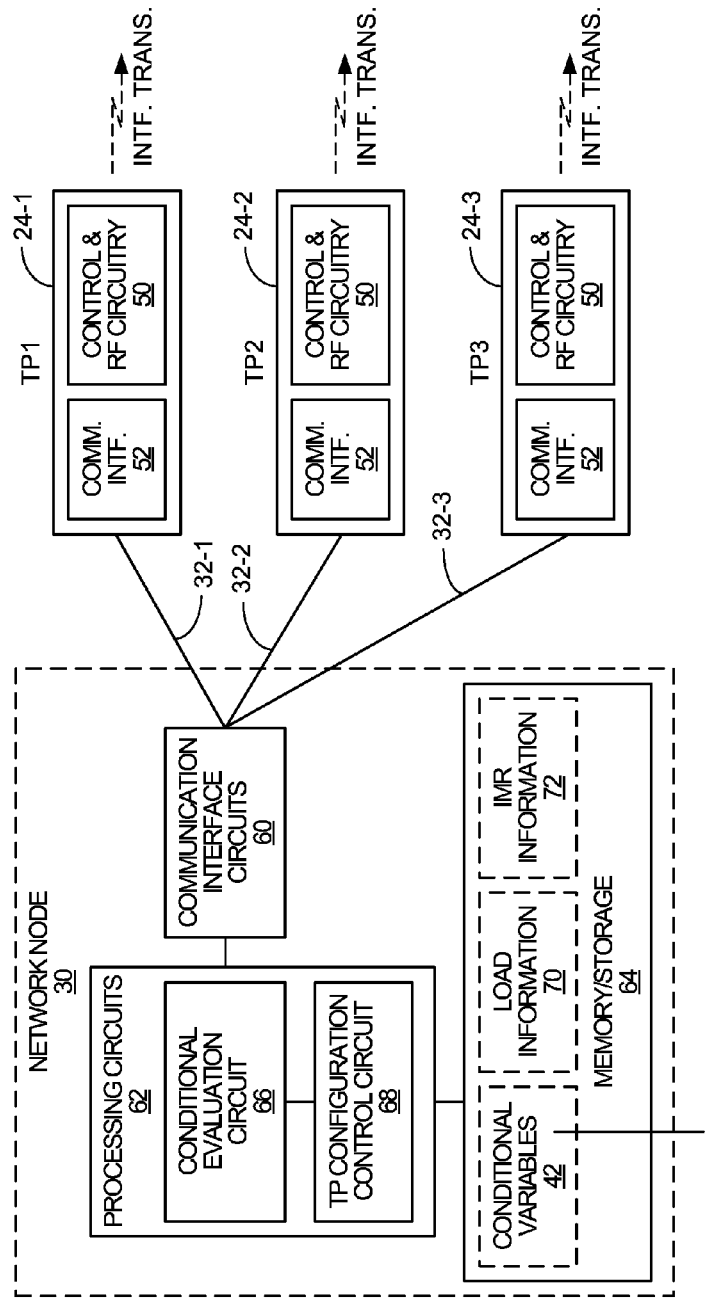
FIG. 8

| IMR | TP1 | TP2 | TP3 |
|---|---|---|---|
| 1 | Not(X1) | X2 | X3 |
| 2 | X1 | Not(X2) | X3 |
| 3 | X1 | X2 | Not(X3) |
| 4 | Not(X1) | Not(X2) | X3 |
| 5 | X1 | Not(X2) | Not(X3) |
| 6 | Not(X1) | X2 | Not(X3) |
| 7 | Not(X1) | Not(X2) | Not(X3) |

FIRST SUBSET 80
SECOND SUBSET 82

*FIG. 9*

| IMR | TP1 | TP2 |
|---|---|---|
| 1 | Not(X1) | X2 |
| 2 | X1 | Not(X2) |
| 3 | Not(X1) | Not(X2) |

*FIG. 10*

| IMR | TP1 | TP2 | TP3 | TP4 | TP5 | TP6 |
|---|---|---|---|---|---|---|
| 1 | Not(X1) | X2 | X3 | Not(X4) | X5 | X6 |
| 2 | X1 | Not(X2) | X3 | X4 | Not(X5) | X6 |
| 3 | X1 | X2 | Not(X3) | X4 | X5 | Not(X6) |
| 4 | Not(X1) | Not(X2) | Not(X3) | X4 | X5 | X6 |
| 5 | X1 | Not(X2) | Not(X3) | Not(X4) | X5 | X6 |
| 6 | X1 | X2 | Not(X3) | Not(X4) | Not(X5) | X6 |
| 7 | X1 | X2 | X3 | Not(X4) | Not(X5) | Not(X6) |
| 8 | Not(X1) | X2 | X3 | X4 | Not(X5) | Not(X6) |
| 9 | Not(X1) | Not(X2) | X3 | X4 | X5 | Not(X6) |

*FIG. 11*

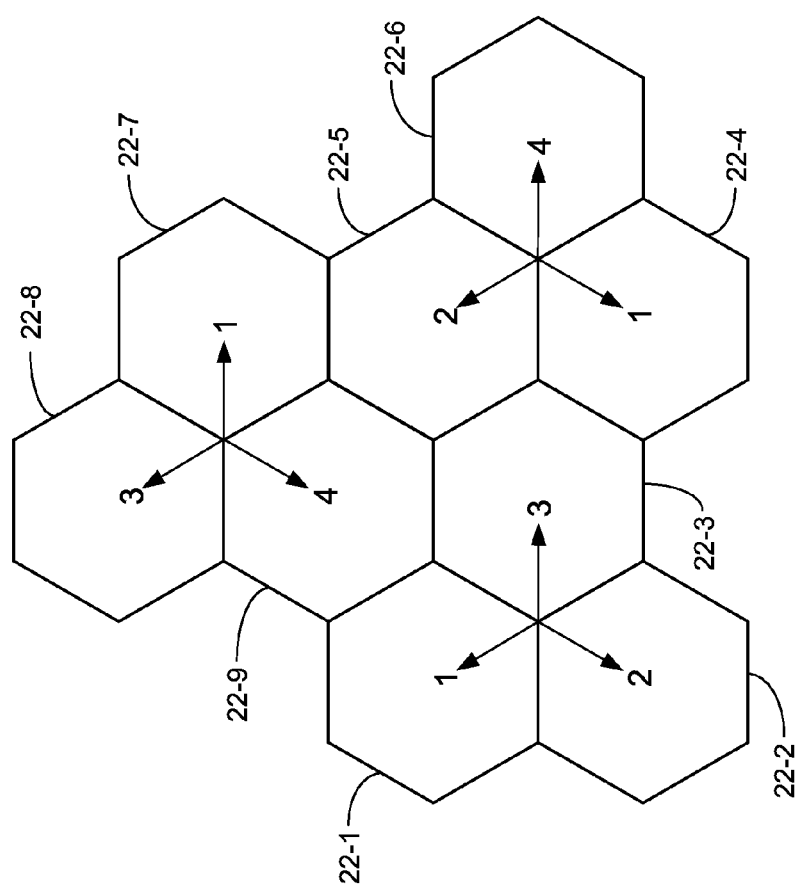
FIG. 12

| IMR | TP1 | TP2 | TP3-TP10 (LPNs) |
|---|---|---|---|
| 1 | Not(X1) | X2 | X3 |
| 2 | X1 | Not(X2) | X3 |
| 3 | X1 | X2 | Not(X3) |
| 4 | Not(X1) | Not(X2) | X3 |
| 5 | X1 | Not(X2) | Not(X3) |
| 6 | Not(X1) | X2 | Not(X3) |
| 7 | Not(X1) | Not(X2) | Not(X3) |

*FIG. 13*

LOAD-INVARIANT CONFIGURATION OF INTERFERENCE MEASUREMENT RESOURCES

RELATED APPLICATIONS

This application claims priority from the U.S. provisional patent application filed on 9 Oct. 2012 and assigned U.S. App. No. 61/711,518, and which is incorporated herein by reference.

TECHNICAL FIELD

The present invention generally relates to wireless communication networks and particularly relates to measuring and reporting interference in coordinated multi point transmission applications.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output, "MIMO", communication channel. Such systems and/or related techniques are commonly referred to as MIMO.

The LTE standard is currently evolving with enhanced MIMO support. A core component in LTE is the support of MIMO antenna deployments and MIMO related techniques. For instance, LTE-Advanced supports a spatial multiplexing mode that provides for channel-dependent precoding. The spatial multiplexing mode is intended for high data rates in favorable channel conditions and it relies on antenna precoding, which, as noted, may be channel dependent. This is also commonly referred to as closed-loop precoding, where the aim is to focus the transmit energy into a subspace that is strong in the sense of conveying much of the transmitted energy to the targeted user equipment or "UE". In addition, the precoder matrix—which comprises the per antenna signal weightings—also may be selected to strive for orthogonalizing the channel, meaning that after proper linear equalization at the UE, the inter-layer interference is reduced.

Channel State Information Reference Symbols, "CSI-RS", were introduced in LTE Release-10, for use in estimating channel state information or "CSI". A CSI-RS resource can loosely be described as the pattern of resource elements on which a particular CSI-RS configuration is transmitted. A CSI-RS resource is determined by a combination of "resourceConfig", "subframeConfig", and "antennaPorts-Count" parameters, which are configured by Radio Resource Control, "RRC", signaling.

The CSI-RS provide several advantages over basing the CSI feedback on common reference symbols, "CRS", which were used for CSI estimation in previous releases. First, the CSI-RS are not used for data signal demodulation, and thus do not require the same density—i.e., the overhead of the CSI-RS is substantially less than the CRS. Second, the CSI-RS provide a much more flexible basis for configuring CSI feedback measurements from UEs—e.g., which CSI-RS resource(s) to measure on can be configured in a UE specific manner. Moreover, supporting antenna configurations larger than four antennas must resort to the use of CSI-RS, because the CRS are only defined for a maximum of four antennas.

By measuring on a CSI-RS, a UE can estimate the effective channel the CSI-RS is traversing, including the radio propagation channel, antenna gains, and any possible antenna virtualizations—i.e., a CSI-RS port may be precoded so that it is virtualized over multiple physical antenna ports. In other words, the CSI-RS port can be transmitted on multiple physical antenna ports, possibly with different gains and phases. In more mathematical rigor this implies that if a known CSI-RS signal $x_n$ is transmitted, a UE can estimate the coupling between the transmitted signal and the received signal—i.e., the effective channel.

Hence if no virtualization is performed in the transmission of $x_n$, the received signal $y_n$ can be expressed as $$y_n = H_n x_n + e_n,$$

and the UE can estimate the effective channel $H_{eff} = H_n$. Similarly, if the CSI-RS is virtualized using a transmit precoder matrix $W_{N_T \times r}$ as $$y_n = H_n W_{N_T \times r} x_n + e_n,$$

then the UE can estimate the effective channel $H_{eff} = H_n W_{N_T \times r}$, where $N_T$=the number of transmit antennas used for precoding and r=the rank, i.e., the number of spatial multiplexing layers used.

The concept of zero-power CSI-RS resources—also known as a muted CSI-RS—is related to CSI-RS. Zero power CSI-RS resources are configured just as regular CSI-RS resources, so that a UE knows that data transmissions are mapped around those resources. However, the intent of the zero-power CSI-RS resources is to enable the network to mute transmissions on the corresponding resources, to thereby boost the signal-to-noise-plus-interference, "SINR", of a corresponding non-zero power CSI-RS that is possibly transmitted in a neighbor cell/transmission point.

Release 11 of LTE introduces a special zero-power CSI-RS, for which a UE may be mandated to use in measuring interference plus noise. The UE can assume that the transmission points or "TPs" of interest are not transmitting on the zero-power CSI-RS resources, and the received power at the UE can therefore be used as a measure of the interference plus noise.

Based on a specified CSI-RS resource and on an interference measurement configuration—e.g. a zero-power CSI-RS resource—the UE can estimate the effective channel and noise plus interference, and consequently also determine which rank, precoder and transport format to recommend as best matching the particular channel.

For CSI feedback, LTE has adopted an implicit CSI mechanism in which a UE does not explicitly report the complex valued elements of a measured effective channel, for example. Instead, the UE recommends a transmission configuration for the measured effective channel. The recommended transmission configuration thus implicitly gives the network information about the underlying channel state.

In LTE, such CSI feedback is given in terms of a transmission rank indicator or "RI", a precoder matrix indicator or "PMI", and one or more channel quality indicators or "CQIs". The CQI/RI/PMI report from a UE can be wideband or frequency-selective, depending on the configured reporting mode.

The RI corresponds to a recommended number of data streams that are to be spatially multiplexed and thus transmitted in parallel over the effective channel. The PMI identifies a recommended precoder, e.g., an index pointing to precoder matrix $W_{N_T \times r}$ in a codebook, to use for precoding the transmission. The PMI thus relates to the spatial characteristics of the effective channel. The CQI represents a recommended transport block size—i.e., the code rate. There is thus a relation between the CQI and the SINR of the spatial stream(s) over which the transport block is transmitted.

Coordinated Multipoint or "CoMP" transmission and reception refers to a system where the transmission and/or reception at multiple, geographically separated antenna sites is coordinated in order to improve system performance. More specifically, CoMP refers to coordination of antenna arrays that have different geographical coverage areas. An antenna covering a certain geographical area as a point is referred to herein as a "transmission point" or "TP". Coordination among a set of CoMP TPs can be based on distributed or centralized control.

LTE uses CoMP to improve high data rate coverage, cell-edge throughput and/or to increase system throughput. In particular, the goal is to distribute the user-perceived system performance more evenly in the network by taking control of the interference in the system, either by reducing the interference and/or by better prediction of the interference.

CoMP operation targets many different deployments, including coordination between sites and sectors in cellular macro deployments, as well as different configurations of heterogeneous deployments, where for instance a macro node coordinates the transmission with pico nodes within the macro coverage area.

There are many different CoMP transmission schemes that are considered, including these examples:
  dynamic point blanking where one or more transmission points mute their transmissions on time-frequency resources (TFREs) allocated to UEs experiencing significant interference;
  dynamic point selection where the data transmission to a UE switches dynamically (in time and frequency) between different transmission points, so that the various transmission points are fully utilized;
  coordinated beamforming where the transmission points coordinate their transmissions in the spatial domain, based on beamforming the transmission power in such a way that the interference to UEs served by neighboring transmission points are suppressed; and
  joint transmission where the signal to a UE is simultaneously transmitted from multiple transmission points on the same time/frequency resource, with the aim of joint transmission being an increase in the received signal power and/or a reduction in the received interference, if the cooperating transmission points otherwise would serve some other UEs without taking the joint-transmission UE into consideration.

CoMP feedback is a common denominator for the CoMP transmission scheme examples given above, and for CoMP systems in general. In this regard, CoMP feedback provides the network with needed CSI information, not only for the serving transmission point, but also for the channels linking the neighboring transmission points to a given UE. For example, by configuring a unique CSI-RS resource per transmission point, a UE can resolve the effective channels for each transmission point by measurements on the corresponding CSI-RS. Here, it should be noted that the UE likely is unaware of the physical presence of any particular transmission point; instead, the UE simply is configured to measure on a particular CSI-RS resource, without knowing the association between the CSI-RS resource and the particular transmission point.

CoMP feedback for LTE Release-11 builds upon per CSI-RS resource feedback, which corresponds to separate reporting of CSI for each of a set of CSI-RS resources. Such a CSI report could for example correspond to a PMI, RI, or CQI, which represent a recommended configuration for a hypothetical downlink transmission over the same antennas used for the associated CSI-RS, or as the RS used for the channel measurement. More generally, the recommended transmission should be mapped to physical antennas in the same way as the reference symbols used for the CSI channel measurement. Potentially there could be interdependencies between the CSI reports; for example, they could be constrained to have the same RI.

Typically there is a one-to-one mapping between a CSI-RS and a transmission point, in which case per CSI-RS resource feedback corresponds to per-TP feedback. That is, a separate PMI/RI/CQI is reported for each transmission point. The considered CSI-RS resources are configured, e.g., by an eNodeB or other network node, as the "CoMP Measurement Set".

Interference measurements are important for efficient CoMP operation, and it is as important to capture appropriate interference assumptions when determining the CQIs in a CoMP environment, as it is to capture the appropriate received desired signal. In uncoordinated systems, a UE or other wireless device can effectively measure the interference observed from all other transmission points or cells, which will be the relevant interference level in an upcoming data transmission. The UE typically performs such interference measurements by analyzing the residual interference on CRS resources, after subtracting the impact of the CRS signal.

In coordinated systems performing CoMP, such interference measurements become increasingly irrelevant. Most notably, within a coordination cluster, i.e., a set of CoMP transmission points, the coordinating node(s) to a large extent can control which transmission points interfere with a UE in any particular Time-Frequency Resource Element or "TFRE." Hence, there will be multiple interference hypotheses for the UE, each depending on which transmission points are transmitting data to other UEs.

Release 11 of LTE introduces certain new functionality to improve interference measurements. In particular, it is now agreed that the network will be able to configure a UE to measure interference on a particular Interference Measurement Resource, "IMR". Each defined IMR identifies a particular set of TFREs that is to be used by the UE for a corresponding interference measurement. The network can thus control the interference seen by a UE on any given IMR by controlling which transmission points within a CoMP cluster transmit on the IMR. If all transmission points in the cluster are muted on that IMR, the IMR may be used by the UE for measuring inter-cluster interference. With respect to a given IMR, the particular pattern of transmitting and non-transmitting transmission points defines the intra-cluster interference hypothesis represented by that IMR.

The network must be able to accurately evaluate the performance of the UE for different CoMP transmission hypotheses; otherwise dynamic coordination becomes meaningless. Thus the network must to be able to track and estimate different intra-cluster interference levels corresponding to the different transmission and blanking hypotheses. See, for example, FIG. 1 in which two transmission points 10-1 and 10-2 operated as a CoMP set of transmission points 10 for a UE 12. The CoMP set also may be referred to as coordination cluster.

FIG. 2 illustrates a table embodying a dynamic transmission-point blanking scheme which may be applied to the transmission points 10-1 and 10-2, also referred to as "TP1" and "TP2", respectively. In the table, one sees three rows, each corresponding to a different defined IMR, i.e., IMR1, IMR2, and IMR3. As noted, each IMR nominally represents a different interference hypothesis. In the table, a "1" indicates that the TP 10 is transmitting on the IMR and a "0" indicates that the TP 10 is blanked (muted) for the IMR.

Assuming that TP1 is the serving TP 10 for the UE 12, there are two relevant interference hypotheses. In a first relevant hypothesis, the UE 12 sees no interference from the coordinated neighboring transmission point TP2, because TP2 is muted and hence the UE 12 will only experience the signal from its serving transmission point, TP1, in addition to any uncoordinated inter-cluster interference including background noise and interference from uncoordinated devices. In the second relevant hypothesis, the UE 12 sees interference from the neighboring point, TP2, as well as the signal from its serving transmission point TP1 and any inter-cluster interference.

To enable the network to effectively determine whether or not a TP 10 should be muted in this example, the UE 12 can report two CQIs corresponding to the different interference hypotheses. The set of IMRs defined in FIG. 2 represent one way to obtain these multiple CQIs from the UE 12.

In particular, the first IMR, IMR1, corresponds to the first relevant hypothesis mentioned above, i.e., no interference from TP2, and with the implicit assumption that the desired signal originates from the TP1, hence no interference from TP1. Note that the IMR only covers the interference part of the CoMP transmission hypothesis, the desired signal part of the transmission hypothesis is configured using a CSI-RS that defines the channel between the UE 12 and a hypothetical signal source. In other words, to accommodate a CoMP transmission hypothesis where the desired signal originates from TP1, one should use an associated IMR that applies blanking or muting of TP1, represented with "0" in the table, so that the signal from TP1 is not counted as interference.

The second IMR or IMR2 corresponds to the second relevant hypothesis. Again, the "0" blanking or muting of TP1 represents the fact that it is the source of a desired signal rather than an interfering signal, while the "1" in row2/column2 means that TP2 is transmitting an interfering signal on the TFRE of IMR2.

Finally there is also a third IMR defined but this one is of no interest for the illustrated UE 12, because TP1 is the serving TP. It is not interesting to consider it as a source of interference for the UE 12. The network can therefore configure the UE 12 to only measure and report CSI feedback for IMR1 and IMR2.

The above example illustrates the principle of selecting relevant IMRs for a dynamic point blanking CoMP scheme. In such a scheme, the only IMRs that are relevant to a given UE 12 are those IMRs in which the serving TP 10 is muted, because the serving TP 10 is not a source of interference for the served UE 12. Of course, in other CoMP schemes, such as in dynamic point switching in particular, the IMRs representing interference from the serving TP 10 could also be of interest.

With the scheme exemplified in FIG. 2, the likelihood that the different interference hypotheses are actually realized in a downlink transmission is dependent on the system load. For example, at relatively high levels of system loading, it is less likely that all TPs 10 within a given coordination cluster are muted, because muting is costly. That is, muting on the TFREs associated with a given IMR represent a forfeiture of transmission resources that otherwise could be used for data transmission, and such forfeitures obviously become more "costly" as system resources become more precious in higher loading scenarios.

Moreover, for a given UE 12, the network in many cases can make a qualified guess that different interference hypotheses will result in similar performance for the UE 12. For example, if two different interference hypotheses differ only in terms of which weakly interfering TPs 10 are blanked, the actual reception performance at the UE 12 may not differ much between the different interference hypotheses. In an example case, the network receives Reference Signal Received Power, "RSRP", measurements from the UE 12, which allow it to recognize which TPs 10 in the CoMP cluster are "weak" interferers with respect to the UE.

The network thus may reduce complexity without any appreciable loss in performance by using one IMR to approximate another, in cases where the two IMRs yield similar effective interference scenarios as the UE 12. A consequence of this recognition is that the importance of receiving CSI that is based on a specific IMR varies from UE 12 to UE 12. The importance also depends on the overall traffic situation in the network. For each UE 12, the network may order the IMRs in a priority list, where some IMRs are more important to include in CSI reporting than others.

This priority allows the network to reduce the amount of CSI reporting without compromising on quality. However, the network remains responsible for configuring the transmissions so that the interference measured on the different IMRs corresponds to the desired interference hypotheses. That is, for each IMR, a set of TPs 10 will be muted, and intra-cluster interference only from the remaining coordinated and/or uncoordinated TPs 10 will be present on the IMR.

In the currently known solutions, the data transmission from a specific TP 10 will be present, or muted, on the TFREs of the IMRs where interference from the transmission point is expected to be present, or absent. This scheme is nicely illustrated in the table given in FIG. 3.

The table in FIG. 3 assumes the presence of three TPs 10 in a CoMP cluster, denoted as TP1, TP2 and TP3. For this set of three TPs 10, seven IMRs are needed to capture all possible muting patterns.

Unlike the scheme illustrated in FIG. 2, the IMRs are defined in terms of regular data transmissions by the TPs 10. For a given IMR, a given one of the TPs 10 will either be muted or will be engaging in a regular data transmission. Thus, in the table, one sees that each IMR is defined by a pattern of 0s and Ds, where a "0" entry indicates that the TP 10 is muted for that IMR and a "D" entry indicates that the TP 10 is engaged in a regular data transmission for the IMR, e.g., to another UE 12. In particular, "D1" denotes a regular data transmission by TP1, "D2" denotes a regular data transmission by TP2, and so on.

Now, assume that a given UE 12 is "connected" to TP1. In this serving role, TP1 is not a relevant source of interference with respect to the UE 12. Thus, the interference hypotheses that are potentially relevant to the UE 12 include those represented by IMR1, IMR4, IMR6 and IMR7. Thus, the UE 12 would provide the network with all channel information for all relevant muting combinations by reporting CSI for IMR1, IMR4, IMR6 and IMR7.

Constructing the IMR table around regular data transmissions as exemplified in FIG. 3 is referred to in this disclosure as "Configuration Methodology A" or "CM-A". A chief advantage of CM-A, as compared to the fixed scheme illustrated in FIG. 2 is that the feedback reporting captures the effects of some TPs 10 being occasionally silent in terms of data transmissions, e.g., because of a low traffic load.

However, there is a significant risk of a UE 12 underestimating interference for one or more IMRs, when dynamic point blanking is applied in the context of CM-A, or, similarly, if the data traffic is highly fluctuating when CM-A is in use. The underestimation of interference occurs because the IMR definitions assume that non-muted TPs 10 will be engaged in regular data transmissions, which will not be true to the extent that there is no data to transmit and these TPs 10 are actually silent on a given IMR. Note that data traffic may fluctuate significantly for any number of reasons. For example, there is a significant fluctuation in data traffic for Transfer Control Protocol or "TCP" connections, which include a slow-start ramping up of traffic flow.

It should also be noted that when the actual blanked/transmitting pattern of a given IMR differs from its nominally defined pattern because of dynamic point blanking, the IMR generally will correspond to the interference hypothesis covered by another IMR. Thus, dynamic point blanking can cause a loss of uniqueness between or among the defined IMRs.

Of course, the network is aware of any dynamic muting that occurs on the IMR in question and the controlling node(s) could be instructed to disregard CSI reports from UEs 12 that are made on IMRs that have been disrupted by dynamically muted transmissions. Even so, it will be recognized that ignoring such CSI reports represents waste of uplink resources and a waste of valuable opportunities to acquire CSI.

Traffic fluctuations can be more problematic with respect to CM-A. For example, when the load in the network is low, there may be many TPs 10 that are silent over longer periods because of low UE density. When a TP 10 is silent, it becomes impossible to acquire CSI feedback indicating what would happen if the TP 10 suddenly began transmitting data, e.g., because an active UE 12 is handed over to it, or because a previously idle UE 12 returns to the active connection state and begins downloading data. Furthermore, the IMRs that have been configured to capture interference variations due to the on/off behavior of the TP will essentially measure the same interference level.

This problem can be addressed to a limited extent by reconfiguring the UEs 12, using RRC signaling, i.e., by reconfiguring specific UEs 12 as regards the IMRs on which they measure and report CSI. Such reconfiguration would be needed as soon as the resource utilization in the system varies, e.g., such as when new UEs 12 arrive or leave. RRC reconfiguration is however a relatively lengthy and cumbersome procedure and therefore is not a suitable mechanism for dealing with dynamic traffic variations. A known alternative to the CM-A approach decouples the signals transmitted on IMRs from the regular data transmissions at the TPs 10. In this second configuration methodology, which is termed "Configuration Method B" or "CM-B", the network maintains IMRs with fixed interference patterns that cover all relevant interference hypotheses—i.e., fixed and distinct combinations of on/off coordination of the different TPs 10 within the coordination cluster.

Such an approach is shown in FIG. 4, again using the example of three TPs 10 in a coordination cluster, denoted as TP1, TP2 and TP3. Again, seven IMRs are needed to capture all possible muting patterns. A "0" entry indicates that the TP 10 is silent in the corresponding IMR, and a "1" entry indicates that an interfering signal is transmitted by the TP 10 on the IMR, independent of any regular data transmission). A UE 12 that is served by TP1 could for instance be configured to report CSI based on IMRs 1, 4, 6, and 7, in order to capture all muting combinations of the interfering TPs 10. The CM-B configuration hence allows a UE 12 to measure IMRs and report corresponding relevant CSI regardless of whether the system load is low or high—i.e., independent of traffic fluctuations at the various TPs 10.

Thus, a primary benefit of the CM-B configuration as compared to the CM-A configuration is that the interference patterns represented by the different IMRs are invariant to fluctuations in data traffic caused by changes in loading, etc. That is, the IMR patterns remain distinct, meaning that a given UE 12 is able to measure and report CSI for a unique pattern of interference on each of its relevant IMRs. This approach means that no CSI report has to be disregarded and that none of the IMRs will, in actuality, overlap, even during times of low resource utilization within the system. Thus, the network will always be able to receive CSI reports for all IMRs that are relevant to a given UE 12. Here, a "relevant" IMR is an IMR that represent an interference hypothesis that is deemed relevant by the network, e.g., an interference hypothesis that is likely to be realized and that provides important information about the strongest interfering TPs 10 for the UE 12 that is under consideration.

However, the CM-B configuration has a number of disadvantages. For example, it is recognized herein that the configuration fails to capture the concept of uneven likelihoods associated with the interference hypotheses represented by different IMRs. Indeed, in some sense, the CM-B configuration treats all IMRs as equally important. To illustrate why this can be disadvantageous, consider a UE 12 that can only afford to feed back one CSI report each reporting instance. The one CSI report should be based on the IMR that corresponds to the most likely interference hypothesis, which typically is the interference hypothesis that is most similar to the interference seen on the regular data resource elements.

Unfortunately, the most relevant IMR changes as a function of changing traffic patterns within the coordination cluster. To keep the UE 12 reporting on the most relevant IMR thus requires an RRC-based reconfiguration any time there is a meaningful change in the traffic patterns within the coordination cluster. The CM-A configuration avoids this problem in that a UE 12 feeding back only one CSI report per reporting interval will base that report on the IMR where only its own serving TP 10 is muted and regular data transmissions by the other, interfering TPs 10 are present—e.g., IMR1 in row 1 of the table shown in FIG. 4.

It is further recognized herein that the CM-B configuration has a similar problem in the case where a UE 12 is configured to report multiple CSI reports, where a first report determines one or more properties of the other reports. For instance, it is advantageous to use the same transmission rank in all CSI reports, because the scheduling towards a UE rank cannot vary in frequency. Thus, the controlling network node(s) can use the multiple CSI reports for frequency selective scheduling by, for example, scheduling a transmission based on CSI from one report on certain subbands and CSI from another report on other subbands, because all such reports are based on the same rank.

In order to achieve this goal, the system may be configured such that the CSI report corresponding to the most likely interference hypothesis for a UE 12 determines the properties, including rank, of the other CSI reports. This will effectively minimize any negative aspect of restricting the properties because the most relevant CSI report remains unrestricted. Using CM-B, most likely the CSI process corresponding to the most relevant CSI report will have to be reconfigured with a new IMR if a second UE 12 is activated for downlink transmission from a previously inactive TP 10.

SUMMARY

According to one aspect of this disclosure, the configuration of which Interference Measurement Resources, "IMRs", a given user equipment, "UE", should measure for Channel State Information, "CSI", reporting is made more or less invariant to dynamic traffic variations affecting the set of Coordinated Multi-Point, "CoMP", transmission points used for serving the UE, or to the use of dynamic blanking for those transmission points. These goals are achieved at least in part by configuring one or more of the transmission points to follow a first rule embodying a negative logic. According to the first rule, the transmission point transmits on a given IMR if it has been deemed as being not likely to transmit data at a time relevant to the IMR, and, conversely, to not transmit the IMR if it has been deemed as being likely to transmit data at a time relevant to the IMR.

More generally, by coupling the logical state of a transmission point being deemed as "likely to transmit data" (or not likely) with how the network manages what interference should be present on a defined IMR, the method and apparatus taught herein maintain distinct IMRs regardless of load, while simultaneously preserving the order of the IMRs. Advantageously, then, UEs do not need to be reconfigured as the resource utilization changes within a set of CoMP transmission points.

An example method is performed at a node in a wireless communication network that is configured for CoMP transmission. The method includes configuring one or more transmission points in a set of CoMP transmission points on a dynamic basis, with respect to one or more IMRs, including configuring a first transmission point to follow a first rule. According to this first rule, which embodies a negative logic operation, the first transmission point: transmits on at least one of the IMRs, if the first transmission point is deemed as being not likely to transmit data at a time relevant to the at least one IMR; and does not transmit on the at least one IMR, if the first transmission point is deemed as being likely to transmit data at a time relevant to the at least one IMR.

The method may further include configuring a second transmission point to follow a second rule, which embodies positive or normal logic. According to the second rule, the second transmission point: transmits on at least one of the IMRs, if the second transmission point is deemed as being likely to transmit data at a time relevant to the at least one IMR; and does not transmit on the at least one IMR, if the second transmission point is deemed as being not likely to transmit data at a time relevant to the at least one IMR.

For a given IMR, one or more transmission points may follow the first rule, and one or more other transmission points in the set may follow the second rule. Further, the same transmission point may be configured to follow the first rule with respect to one or more IMRs, and to follow the second rule with respect to one or more other ones of the IMRs. Still further, the first and second transmission points mentioned above may comprise: the same transmission point taken at different times, or taken with respect to different ones of the IMRs; or different transmission points configured with respect to the same at least one IMR.

In a corresponding example, a node is configured for use in a wireless communication network that is configured for CoMP transmission. The example node includes a communication interface configured for communicating with transmission points in a set of CoMP transmission points, and one or more processing circuits that are operatively associated with the communication interface. The processing circuits are configured to configure one or more of the transmission points to follow the first rule, as described above, for one or more of the IMRs, and also may configure one or more transmission points in the set to follow the second rule, for one or more of the IMRs. In an example embodiment, for a given IMR, the processing circuits are configured to logically divide the set of transmission points into two subsets, with transmission points in a first one of the subsets configured to follow the first rule, and transmission points in the second subset to follow the second rule.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of a known example of CoMP transmission points in a wireless communication network.

FIGS. 2-4 are tables illustrating example approaches that are known for configuring CoMP transmission points with respect to defined IMRs.

FIG. 5 is a diagram of one embodiment of a wireless communication network that includes a node that configures transmission points with respect to one or more defined IMRs, according to the teachings herein.

FIGS. 6A and 6B are diagrams of example relationships between individual IMRs and CoMP transmission points, as controlled by a corresponding set of control variables.

FIG. 7 is a logic flow diagram of one embodiment of a method of processing at a network node, as taught herein for configuring the behaviour of one or more transmission points with respect to one or more IMRs, via use of the control variables introduced in FIGS. 6A and 6B.

FIG. 8 is a block diagram of one embodiment of a network node, as may be configured to carry out the processing method of FIG. 7, for example.

FIGS. 9-11 are tables illustrating example transmission point configurations and behaviour with respect to a defined set of IMRs, based on use of corresponding control variables as taught herein.

FIG. 12 is a diagram of a CoMP network configuration according to an embodiment herein.

FIG. 13 is a table illustrating further example transmission point configurations and behaviour with respect to a defined set of IMRs, based on use of corresponding control variables as taught herein.

DETAILED DESCRIPTION

FIG. 5 illustrates a wireless communication network 20 that includes a number of cells or service areas 22-1, 22-2 and 22-3, associated with corresponding transmission points 24-1, 24-2 and 24-3. There may be a lesser or greater number of cells 22 and transmission points 24, and they may be arranged as one or more sets of CoMP transmission points, which are also referred to as coordination clusters or CoMP clusters. Unless suffixes are needed for clarity, the number "22" is used for generic reference to cells in both singular and plural senses. The same scheme is adopted for the number "24" with respect to transmission points.

According to further example details in FIG. 5, the transmission points 24 transmit downlink signals 26 to a wireless device 28, e.g., the transmission point 24-1 transmits downlink signals 26-1, the transmission point 24-2 transmits downlink signals 26-2, and so on. For convenience, the term "user equipment 28" or "UE 28" is used in place of the term "wireless device 28". However, it should be understood that the term UE should be given broad construction, denoting essentially any type of phone, PDA, pager, computer, network adaptor, or other device having wireless communication capability that is compatible with and configured for use according to the protocols and signaling used in the network 20.

The downlink transmissions 26 occur individually or jointly, in dependence on the type of CoMP service(s) provided by the set of CoMP transmission points 24, the connection state of the UE 28, and on the services and/or applications in use by the UE 28. It will be appreciated that the term "UE" is used broadly, and the UE 28 is essentially any type of communication device configured for operating in the network 20.

One also sees a node 30, which has communication links 32 with the various transmission points 24, e.g., a communication link 32-1 with the transmission point 24-1, a communication link 32-2 with the transmission point 24-2, and so on. This arrangement is a non-limiting example, however. That is, while the node 30 may be centralized with respect to the transmission points 24 in the CoMP set, it actually may be one of the transmission points 24. In an example case, the node 30 comprises an eNodeB in an LTE-based embodiment of the network 20. The other transmission points 24 also may be eNodeBs, but one or more of them may be low-power or "pico" nodes.

The transmit/not-transmit configuration of one or more of the transmission points 24 is controlled with respect to one or more defined Interference Measurement Resources or "IMRs", based on the configuration of the transmission points 24 to follow a first rule or to follow a second rule. With respect to a given IMR, a transmission point 24 configured to follow the first rule will transmit on the IMR if the transmission point 24 has been deemed as being not likely to transmit data at a time relevant to the IMR, and will not transmit on the IMR if the transmission point 24 has been deemed as being likely to transmit data at a time relevant to the IMR. Conversely, a transmission point 24 configured to follow the second rule will not transmit on the IMR if the transmission point 24 has been deemed as being not likely to transmit data at a time relevant to the IMR, and will transmit on the IMR if the transmission point 24 has been deemed as being likely to transmit data at a time relevant to the IMR. In this regard, the first rule can be understood as applying complementary or negative logic, as compared to the second rule.

In an example approach, the "deemed" condition of a given transmission point 24 is maintained and indicated through the use of a control variable that can be understood as being a flag or other datum having a value or state that indicates whether the given transmission point 24 is deemed as being likely or not likely to transmit data at a time relevant to a given IMR, or relevant to more than one IMR, e.g., to the extent that more than one of the IMRs have the same relevant times.

FIGS. 6A and 6B illustrate example logical arrangements in this regard. In particular, FIG. 6A illustrates a first arrangement wherein IMRs are denoted using the reference number "40", e.g., a first IMR is denoted as "IMR1" and is numbered as IMR 40-1, a second IMR is denoted as "IMR2" and is numbered as IMR 40-2, and so on. It will be understood that each IMR 40-1, 40-2, etc., represents a unique interference hypothesis for the set of CoMP transmission points 24. When suffixes are not needed for clarity, the number "40" is used generically to refer to IMRs in the singular and plural sense.

Further according to the example arrangement in FIG. 6A, each IMR 40 has a corresponding control variable 42, for each one of the transmission points 24 in the CoMP set. That is, there is a control variable 42-11, denoted as "CV11", which serves as the control variable used by whichever rule governs the behavior of the transmission point 24-1 with respect to IMR1. As the transmission point 24-1 is denoted as "TP1" in the diagram, the first digit in the control variable suffix "11" can be understood as indicating IMR1, while the second digit can be understood as indicating TP1. Thus, one sees a control variable denoted as "CV12" and numbered as 42-12, indicating that it serves as the control variable for IMR2, with respect to TP1. The same arrangement is extended for IMR2 through IMRN, with respect to TP1 through TPM, where N and M are integer numbers, representing the total number of defined IMRs 40 and the total number of TPs 24 in the CoMP set.

The arrangement of FIG. 6A can thus be understood as maintaining a separate control variable 42 for each IMR 40, with respect to each TP 24. However, it may be that one control variable 42 can be used in common for more than one TP 24 and/or more than one IMR 40. FIG. 6B illustrates an example of such an arrangement, wherein there is one control variable 42-1, denoted as "CV1" and used in common for TP1, with respect to three different IMRs 40, i.e., IMR1, IMR2, and IMR3.

Thus, the number of control variables 42 maintained for the transmission points 24 may comprise N×M, i.e., the number of IMRs 40 times the number of transmission points 24, in which case there is a separate control variable 42 for each unique pairing of IMRs 40 and transmission points 24. This arrangement is suggested in FIG. 6A. On the other hand, as suggested in FIG. 6B, for a given transmission point 24, there may be a control variable 42 that is shared in common between the IMRs 40 having the same or similar "relevant times" as that term is used herein, to refer to times that coincide with or that are within some offset of the time-wise resources used for the IMRs 40 at issue.

Thus, in an example embodiment, a transmission point 24 is configured to follow the first rule, as that rule was described above. Then, in the context of the transmission point behaving according to the first rule with respect to a given IMR 40, the deemed condition of the transmission point 24 is ascertained or otherwise determined by inspecting the relevant control variable 42. Advantageously, the control variable 42 is maintained in a dynamic sense, meaning that it is updated from time to time, to reflect changing conditions, e.g., based on evaluating one or more conditions relating to traffic activity and/or traffic loading. In this manner, a given transmission point 24 following either the first rule or the second rule will change its transmit/not-transmit behavior with respect to a given IMR 40, based on the dynamically changing state of the control variable 42 maintained for that IMR 40 and transmission point 24.

Still further, it should be understood that not all transmission points 24 within a CoMP set are necessarily controlled according to the teachings herein, i.e., not every transmission point 24 in a CoMP set of transmission points 24 is necessarily configured to follow one of the first and second rules, nor is it necessarily the case that the disclosed rules-based transmission point behavior is implemented for every IMR 40 that is defined in the network 20.

With these possible variations in mind, FIG. 7 illustrates one embodiment of a method 700 at a node 30 in a wireless communication network 20 for CoMP transmission. The method 700 includes configuring one or more transmission points 24 in a set of CoMP transmission points 24 on a dynamic basis, with respect to one or more defined IMRs 40 (Block 702). This configuration step at least includes configuring a first transmission point 24 to follow a first rule according to which the first transmission point 24: transmits on at least one of the IMRs 40, if the first transmission point is deemed as being not likely to transmit data at a time relevant to the at least one IMR 40; and does not transmit on the at least one IMR 40, if the first transmission point is deemed as being likely to transmit data at a time relevant to the at least one IMR 40.

It will be appreciated that Block 702 may be repeated and/or performed as part of a larger set of transmission point configuration processing. For example, the method 700 may further include configuring a second transmission point 24 in the set to follow a second rule according to which the second transmission point 24 transmits on at least one of the IMRs 40, if the second transmission point 24 is deemed as being likely to transmit data at a time relevant to the at least one IMR 40; and does not transmit on the at least one IMR 40, if the second transmission point 24 is deemed as being not likely to transmit data at a time relevant to the at least one IMR 40.

In an example of such configuration processing, for a given IMR 40, one or more transmission points 24 in the set are configured to follow the first rule, and one or more other transmission points 24 in the set are configured to follow the second rule. The first and second transmission points 24 may comprise the same transmission point 24 taken at different times, or taken with respect to different ones of the IMRs 40, or comprise different transmission points 24 configured with respect to the same IMR(s) 40, or comprise different transmission points 24 as configured with respect to different IMRs 40.

The method 700 may further comprise maintaining one or more control variables 42, where each control variable 42 indicates whether a corresponding one or ones of the transmission points 24 in the set is deemed as being likely or not likely to transmit on a respective one or ones of the IMRs 40. An example of such processing includes, for each control variable 42, dynamically setting the control variable 42 to: a first state if the corresponding one or ones of the transmission points 24 is deemed as being likely to transmit data at a time relevant to the respective one or ones of the IMRs 40; or a second state if the corresponding one or ones of the transmission points 24 is deemed as being likely to transmit data at a time relevant to the respective one or ones of the IMRs 40, wherein the first and second states are complementary.

Further, in some embodiments, the method 700 includes determining whether any given transmission point 24 is deemed as being likely or not likely to transmit data at a time relevant to any given IMR 40, based on reading the value of the control variable 42 maintained with respect to the given IMR 40 and the given transmission point 24.

An example of such processing is seen in sub-blocks 702A and 702B in FIG. 7, where these substeps represent a non-limiting example of implementing the rule-based configuration processing of Block 702. In Block 702A, the method 700 includes, for a given transmission point 24 and a given IMR 40, deeming the transmission point 24 as being likely to transmit data at a time relevant to the IMR 40, or deeming the transmission point 24 as being not likely to transmit data at a time relevant to the IMR 40. Correspondingly, in Block 702B, the method 700 includes setting a corresponding control variable 42 to a first state if the transmission point 24 was deemed as being likely to transmit data at a time relevant to the IMR 40, and otherwise setting the control variable 42 to a second state if the transmission point was deemed as being not likely to transmit data at a time relevant to the IMR 40.

In an example configuration, the first and second states are complementary, i.e., the second state is the logical complement of the first state. As such, a transmission point 24 following the first rule will transmit on an IMR 40 if the applicable control variable 42 is set to the second state (the not-likely-to-transmit state), and will not transmit on the IMR 40 if the applicable control variable 42 is set to the first state (the likely-to-transmit state). Conversely, a transmission point 24 following the second rule will transmit on an IMR 40 if the applicable control variable 42 is set to the first state, and will not transmit on the IMR 40 if the applicable control variable 42 is set to the second state.

Of course, it is contemplated herein that it is not necessary to maintain explicit control variables per se. For example, the rule-based configuration of transmission points 24 as taught herein can use an algorithm that computes whether a transmission point 24 is deemed likely to transmit or not for any one or more IMRs 40. This algorithm would be executed whenever the "likely to transmit" determination is needed.

Any of these and other variations of the method 700 are implemented in the node 30 illustrated in FIG. 8, for example. One sees that each transmission point 24 includes control and radiofrequency, "RF", circuitry 50 that is used for transmitting signals to and receiving signals from UEs 28, which is not shown in the figure. Each transmission point 24 further includes a communication interface 52 that communicatively couples via a communication link 32 to the node 30, which in turn includes its own communication interface 60 for communicating with the transmission points 24.

The node 30 further includes one or more processing circuits 62, which include or are associated with memory/storage 64, which may comprise volatile and/or non-volatile memory or other computer-readable media. At least functionally, the one or more processing circuits 62 include a conditional evaluation circuit 66, and a TP configuration control circuit 68.

The conditional evaluation circuit 66 is configured to determine, for example, the "deemed" state of the transmission points 24—i.e., the functional or logical processing circuit that determines whether a given transmission point 24 is deemed as being likely to transmit with respect to a given IMR 40, or is deemed as being not likely to transmit with respect to that IMR 40. Correspondingly, the TP configuration control circuit 68 is the processing unit or entity that is responsible for configuring a given transmission point 24 to transmit or not transmit on the given IMR 40, either in dependence on the state of the corresponding control variable 42, or in dependence on the complement of the state of the control variable 42.

The control variables 42 and related information, e.g., downlink transmit buffer statuses, UE connection information, etc., may be stored in the memory/storage 64, along with load information 70 for the CoMP set and/or the network 20 at large, and IMR information 72. The IMR information 72 may comprise a listing, table or other data structure of defined IMRs 40, including TFRE information for each defined IMR 40.

However functionally configured, the one or more processing circuits 62 are operatively associated with the communication interface 60 and are configured to: maintain an indication (e.g., a control variable 42) of, or otherwise determine as needed, whether a transmission point 24 in the set of CoMP transmission points 24 is deemed as being likely or not likely to transmit data at a time relevant to one or more IMRs 40. If a control variable 42 is maintained for such purposes, then the processing circuits 62 dynamically set the control variable 42 to a first state if the transmission point 24 is deemed as being likely to transmit data at a time relevant to the one or more IMRs 40, or to a second state if the transmission point 24 is deemed as being not likely to transmit data at a time relevant to the one or more IMRs 40. Again, the first and second states are complementary states.

The processing circuits 62 are further configured to configure the transmission point 24 to transmit or not transmit on at least one of the one or more IMRs 40 in dependence on whether the transmission point 24 has been deemed as being likely to transmit data at a time relevant to the one or more IMRs 40, or has been deemed as being not likely to transmit data at a time relevant to the one or more IMRs 40.

In an example scenario with respect to at least one IMR 40, at least one of the transmission points 24 in a set of CoMP transmission points 24 is configured to follow a first rule, wherein the transmission point 24 transmits on the IMR 40 if it has been deemed as being not likely to transmit data at a time relevant to the IMR 40, and, conversely, does not transmit on the IMR 40 if it has been deemed as being likely to transmit data at a time relevant to the IMR 40. The same transmission point 24 for a different time and/or IMR 40, or a different transmission point 24 for the same or a different IMR 40, may be configured to follow a second rule, wherein the transmission point 24 transmits on the IMR 40 if it has been deemed as being likely to transmit data at a time relevant to the IMR 40, and, conversely, does not transmit on the IMR 40 if it has been deemed as being not likely to transmit data at a time relevant to the IMR 40.

If control variables 42 are used to condition execution of such rules, a given control variable 42 is set to a first state, to indicate that the corresponding transmission point(s) 24 is/are deemed as being likely to transmit data at a time relevant to one or more IMRs 40. Conversely, the control variable 42 is set to a second state, which is a complement of the first state, to indicate that the transmission point(s) 24 is/are deemed as being not likely to transmit data at a time relevant to the one or more IMRs 40.

According to any or all such configurations of the node 30, which may be an eNodeB or other radio transceiver node in the network 20, operation of the node 30 reduces the amount and/or recurrence of configuration signaling needed for a set of transmission points 24 operating as a CoMP cluster, with respect to supporting CSI measurements on one or more IMRs 40 by UEs 28 or other wireless devices, for coordinated link adaptation. The operation of the node 30, as exemplified in the above details, offers the particular advantage of making the configuration of which IMRs 40 a UE 28 should measure on more or less invariant to dynamic traffic variations and/or dynamic blanking of transmission points. Such advantages are gained, for example, by configuring a transmission point 24 with respect to one or more IMRs 40 to follow, e.g., the first or second rule.

The "likely to transmit data" and the "not likely to transmit data" states at issue herein reflect "deemed" states indicating that, with respect to an upcoming subframe or other transmission window, the transmission point 24 is deemed as being likely to transmit (regular) data at a time relevant to the IMR(s) 40, or conversely is deemed as not being likely to transmit data at the relevant time(s). The deemed state thus serves as a conditional evaluation that is dynamically updated for the transmission point 24 in view of changing load conditions, e.g., as a Boolean value that is set to a 1 or other "true" state if the transmission point 24 is deemed as being likely to transmit data for a given timeframe of interest and that is set to 0 or other "false" state if the transmission point 24 is not considered likely to transmit data. The node 30 is configured to make such "deeming" decisions on a recurring basis and/or on an as-needed (on demand) basis, e.g., based on knowledge at the time of evaluation as to whether a given transmission point 24 has any buffered downlink data for transmission to any UEs 28 being served by the transmission point 24.

This use of transmit/not-transmit rules conditioned on deemed states to control which transmission points 24 are active on a given IMR 40 allows the network 20 to maintain distinct IMRs 40 regardless of load. Simultaneously, such coupling preserves the order of the IMRs 40, so that the UEs 28 do not need to be reconfigured as the resource utilization within the CoMP cluster changes.

As an illustrative example, consider the table shown in FIG. 9. Here, the set of CoMP transmission points 24 comprises three transmission points 24, denoted as TP1, TP2 and TP3. Again, there are seven distinct interference hypotheses, with each row in the table representing one of IMR1 through IMR7, corresponding to these hypotheses.

The table can be understood as a configuration imposed on the transmission points 24 by the node 30. For IMR1 as represented by row 1 in the table, TP1 is configured to transmit or not transmit on IMR1 based on the complement of the state of the corresponding control variable 42 maintained for TP1 with respect to IMR1, which is represented by X1 in the TP1 cell of row 1. Thus, if TP1 has been deemed as being likely to transmit data at a time relevant to IMR1—e.g., at or near to the same subframes as will be used for a next scheduled transmission on the TFREs allocated to IMR1—then the corresponding control variable 42 will be set to the first or true state. Thus, X1 in row 1 will be true or false in dependence on whether the corresponding control variable 42 is set to the first or second state, respectively. The same applies to the X2 and X3 variables, which are used to represent the corresponding control variables 42 maintained for TP2 and TP3, respectively, for IMR1.

Now, assume a relevant time frame where TP1 operates in a serving role for a given UE 28 and has downlink data buffered for transmission to the UE 28, and assume that TP2 and TP3 are not serving any UEs 28. If such conditions applied at the time the node 30 was updating the relevant control variables 42, the control variable 42 represented by X1 would be set to the first or true state, because there is downlink data buffered for transmission at TP1 and TP1 is therefore deemed as being likely to transmit data at a time relevant to, say, IMR1. Lacking any supported UEs 28, TP2 and TP3 would be deemed by the node 30 as being not likely to transmit data at times relevant to IMR1, and the control variables 42 represented by X2 and X3, respectively, would be set by the node 30 to the second or false state. With these settings, TP1 would not transmit on IMR1 because Not(X1) =Not(true)=false, while TP2 and TP3 each would not transmit on IMR1 because X2=false and X3=false.

Such an arrangement works well where dynamic blanking is used, in which case a given UE 28 will typically be expected to measure interference on only a subset of the IMRs 40. For the example case of a UE 28 being served by TP1, that subset consists of the IMRs 40 on which TP1 will be silent. In the table, that subset can be seen as those IMRs 40 for which TP1 is configured to use the Not operator—i.e., to condition whether it does or does not transmit on the IMR 40 in question in dependence on the complement of the state of the corresponding control variable 42.

Thus, as shown in FIG. 9, in some embodiments, the node 30 is, for at least one of the IMRs 40, configured to logically divide the set of CoMP transmission points 24 into first and second subsets 80 and 82. Each transmission point 24 in the first subset 80 is configured to transmit or not transmit on the IMR 40 in question in dependence on the complement of the state of the control variable 42 maintained for the transmission point 24, for the IMR 40. One sees this complementary state configuration in the table of FIG. 9 as realized using the "Not" operator for the combinations of IMRs 40 and TPs 24: {IMR1, TP1}, {IMR2, TP2}, {IMR3, TP3}, {IMR4, TP1, TP2}, {IMR5, TP2, TP3}, {IMR6, TP1, TP3}, and {IMR7, TP1, TP2, TP3}.

Thus, the transmission points 24 in the first subset 80 can be understood as using negative logic, via the Not operator.

Consequently, for any given IMR 40 and any given transmission point 24 that has been configured by the node 30 to operate in the first subset 80, the transmission point 24 will transmit on the given IMR 40 if it has been deemed as being not likely to transmit data at a time relevant to that IMR 40—i.e., the corresponding control variable 42=0, thus X=0 and Not(X)=1. Conversely, the transmission point 24 will be silent on the IMR 40 if it has been deemed as being likely to transmit data at a time relevant to the IMR 40—i.e., the corresponding control variable 42=1, thus X=1 and Not(X) =0.

Transmission points 24 in the second subset 82 can be understood as using positive logic, wherein they are configured to transmit or not transmit on a given IMR 40 in dependence on the state of the underlying control variable 42 maintained for the given IMR 40, for the transmission point 24, without complementing via the Not operator. Consequently, for any given IMR 40 and any given transmission point 24 that has been configured by the node 30 to operate in the second subset 82, the transmission point 24 will transmit on the given IMR 40 if it has been deemed as being likely to transmit data at a time relevant to that IMR 40—i.e., the corresponding control variable 42=1, thus X=1. Conversely, the transmission point 24 will be silent on the IMR 40 if it has been deemed as being not likely to transmit data at a time relevant to the IMR 40—i.e., the corresponding control variable 42=0, thus X=0.

With the above in mind, in at least one embodiment, the configuring step (Block 702) in the earlier-illustrated method 700 includes for at least one of the IMRs 40, logically dividing the set of CoMP transmission points 24 into first and second subsets 80, 82. Each transmission point 24 in the first subset 80 is configured to transmit or not transmit on the IMR 40 according to the first rule—e.g., in dependence on the complement of the state of the control variable 42 maintained for the transmission point 24, for the IMR 40. Each transmission point 24 in the second subset 82 is configured to transmit or not transmit on the IMR 40 according to the second rule—e.g., in dependence on the state of the control variable 42 maintained for the transmission point 24, for the IMR 40.

Further, in at least one embodiment, the node 30 is configured to implement the configuring step (Block 702) of the method 700, based on being configured to configure the set of CoMP transmission points 24 on a group-wise basis. Such processing includes configuring a group of the transmission points 24 within the CoMP set of transmission points 24 to transmit or not transmit on a given one or more IMRs 40 according to the second rule. Each transmission point 24 in the group transmits on the given one or more IMRs 40, if any of the transmission points 24 in the group is deemed as being likely to transmit data at a time relevant to the given one or more IMRs 40. Further, none of the transmission points 24 in the group transmit on the given one or more IMRs 40 if all of the transmission points 24 in the group are deemed as being not likely to transmit data at a time relevant to the given one or more IMRs 40.

In some embodiments, for any given transmission point 24 in the overall set of CoMP transmission points 24, the node 30 is configured to deem the transmission point 24 as being likely to transmit data at a time relevant to a given IMR 40 based on evaluating any one or more conditions relating to traffic activity and/or loading. In an example case, the deemed state (likely/not-likely) is based on evaluating a set of traffic activity and/or loading conditions, including any one or more of: determining that the transmission point 24 transmits on the downlink on relevant frequencies (i.e., frequencies relevant to the IMR(s) 40 in question); determining that there is data in a downlink transmission buffer of the transmission point 24; determining that the transmission point 24 is serving as a primary transmission point 24 for one or more UEs 28 operating in the wireless communication network 20; and determining that a loading level of the transmission point 24 is above a defined upper loading threshold. If the set of one or more traffic activity and/or loading conditions is satisfied, the node 30 is configured such that it deems—at least for the time frame of interest—the transmission point 24 as being likely to transmit data at a time relevant to the given IMR 40. Conversely, if the set of one or more traffic activity and/or loading conditions is not satisfied, the node 30 is configured such that it deems—at least for the time frame of interest—the transmission point 24 as being not likely to transmit data at a time relevant to the given IMR 40.

In at least one embodiment, the node 30 is configured to deem any given transmission point 24 in a set of CoMP transmission points 24 as being likely to transmit data at a time relevant to any given one of the IMRs 40, based on the node 30 determining that there is a possibility of such a data transmission from the given transmission point 24. The "likely to transmit" state can be captured by setting the corresponding control variable 42 to 1 or to whatever value is used to indicate the likely to transmit condition. Regardless, the deemed state of being "likely to transmit" does not necessarily mean that there is a greater probability than not that the transmission point 24 will transmit data at a time relevant to the IMR(s) 40 in question. For example, a transmission point 24 may be "deemed" as being likely to transmit in any case where this is a bare possibility that it will transmit data at the relevant time(s).

In other words, "likely to transmit" as used herein does not necessarily connote a fifty-percent or greater probability of data transmission. Instead, it is a logical or control state that is set by the configuration node 30, based on evaluating one or more factors or conditions, such network loading, recent activity within the set of CoMP transmission points 24, whether and/or how many UEs 28 are active within the set of CoMP transmission points 24, etc. The converse or opposite logical state is, of course, the "not likely to transmit" state, which can be represented by setting the corresponding control variable 42 to 0 or whatever value is used to indicate the not likely to transmit condition.

Thus, it should be understood that it is contemplated herein to determine the "likely to transmit" and the converse "not likely to transmit" conditions based on any number of approaches. At the point in time relevant to making the deeming decision, the node 30 may consider a given transmission point 24 as being likely to transmit data at a time relevant to a given IMR 40 in question if: there is at least one UE 28 that regards the transmission point 24 as its serving transmission point 24 for downlink transmissions and/or if the transmission point 24 has downlink data buffered for transmission to the UE 28; the transmission point 24 will transmit data in some part of the present subframe; the node 30 cannot otherwise rule out the possibility that the transmission point 24 will transmit data in a subframe specified by some offset in time into the future; the node 30 knows that data will be transmitted in a relevant subframe, e.g., as specified by some offset in time into the future; the transmission point 24 will transmit data in some part of the present subframe, or that it will be muted only temporarily due to dynamic blanking from coordinated scheduling; or the transmission point 24 will transmit data in some part of the present subframe, or it will be muted only temporarily due to certain slow start procedures of higher layers in the transmission protocol, such as a TCP slow start. An important aspect of these and other "likely to transmit" data definitions contemplated herein is that the node 30 avoids the case where a transmission point 24 that was logically regarded as being not likely to transmit data at a given time in fact does transmit data. Conversely, the definitions reliably result in a transmission point 24 being deemed as being not likely to transmit data at a time relevant to a given IMR 40, in cases where it is clear that regular data will not be transmitted by the transmission point 24 in or in the vicinity of the involved time.

It is also notable that each IMR 40 represents TFREs that are reused on a repeating basis, e.g., on a recurring frame/subframe basis. Thus, the node 30 is configured to dynamically perform the processes of maintaining the control variables 42 for one or more IMRs 40, for one or more transmission points 24, and configuring such transmission points 24 to transmit or not transmit on the one or more IMRs 40 in dependence on the state(s) of the corresponding control variable(s) 42.

In at least one embodiment, the node 30 is configured to deem any given transmission point 24 as being likely or not likely to transmit on the given IMR 40 on a repeating basis, so that the deemed status of the transmission point 24 changes dynamically with changes in loading at the transmission point 24 and/or within the wireless communication network 20. More broadly, in one or more embodiments, the node 30 is configured to maintain the control variable 42 for a given transmission point 24, for a given IMR 40, in a dynamically updated state that changes as a function of changing conditions at the transmission point 24 and/or in the wireless communication network 20.

Further, the node 30 may be configured to configure a UE 28 that is supported by one or more transmission points 24 in the CoMP set to feed back a CSI report, based on measuring interference on at least one of one or more IMRs 40, for which the node 30 maintains control variables 42 and correspondingly configures the transmit/not-transmit behavior of one or more of the transmission points 24. In at least one such embodiment, the CSI report is configured to use a rank indicator, "RI", and/or precoder matrix indicator, "PMI", that is equal to the respective RI and/or PMI from another CSI report that the UE 28 is configured to feed back, where the other CSI report is based on measuring interference on the same at least one IMR 40, or is based on one or more other IMRs 40.

Also, as noted, in some embodiments the node 30 comprises one of the transmission points 24 in the CoMP set, where the node 30 is communicatively linked to the other transmission points 24 in the set. For example, the node 30 comprises a macro node 24 within the set, where the other transmission points 24 in the set are pico nodes 24, i.e., some form of low-power nodes having limited coverage areas and/or limited accessibility. In an alternative example, the node 30 may comprise a centralized control node with respect to any number of transmission points 24, which may be organized dynamically or otherwise as one or more sets of CoMP transmission points.

In any case, use of the "Not" operator as taught herein offers a mechanism for insuring that each IMR 40 within an overall set of IMRs 40 represents a distinct interference hypothesis. As such, each IMR 40 constitutes a unique interference level or pattern. Advantageously, with the teachings presented herein, this uniqueness remains irrespective of changes in loading. Consequently, there is no overlap between the IMRs 40 even for a low load condition within the set of CoMP transmission points 24. This preservation of distinct interference patterns for each IMR 40 in a manner that is invariant to loading stands as a marked improvement over the CM-A configuration described earlier.

Consider the table of FIG. 9 again and assume that a UE 28 is configured to only feed back one CSI report each reporting instance—e.g., the UE 28 is not operating in a CoMP mode. To use the most relevant IMR 40 as its sole interference hypothesis, the network 20 instructs the UE 28 to measure on one of the first three IMRs 40 in the table. The particular one of the first three IMRs 40 selected for CSI reporting by the UE 28 will depend on which transmission point 24 is the primary or serving transmission point with respect to the UE 28. Advantageously, because the transmit/not-transmit configurations of the transmission points 24 are tied to rule-based behavior as taught herein, the particular IMR 40 selected for the UE 28 for CSI reporting will remain the most relevant interference hypothesis for the UE 28, even if the resource utilization within the CoMP set changes.

This aspect of the present teachings represents a distinct advantage over the CM-B configuration described earlier. Further, it will be appreciated that a generalization of this approach is contemplated herein, wherein the UE 28 is configured to report M CSI reports that are based on the N most relevant IMRs 40, where N is an integer number less than or equal to M, which also is an integer.

Another embodiment exploits the fact that IMR transmission control as taught herein is invariant to traffic variations affecting data transmission patterns, frequency or activity within a set of CoMP transmission points 24. This embodiment is characterized by the node 30 or another node in the network 20 configuring a UE 28 to feed back a CSI report based on the most relevant IMR 40, where parts of the resulting CSI report—e.g., the RI and or the PMI—will be reused in other CSI reports, potentially covering other IMRs, that are fed back from the same UE 28.

Further, the teachings herein are not limited to a particular CoMP cluster size—i.e., the teachings are applicable to sets of CoMP transmission points that have a greater or lesser number of transmission points 24 than the three used by way of example for the table of FIG. 9. As one example, consider the table of FIG. 10 in which two transmission points 24, denoted as TP1 and TP2, operate as a CoMP set.

For dynamic point blanking, a UE 28 that is connected to TP1 could in the example of FIG. 10 report CSI based on IMR1 and, and thereby capture all relevant muting combinations of interfering transmission points 24. If CSI feedback covering dynamic point switching is needed, it may also be of interest to configure the UE 28 to make a CSI report based on IMR 2.

Of course, the teachings generalize to a set of N CoMP transmission points 24. With N transmission points 24, a set of $2^N-1$ IMRs 40 can be configured to capture all relevant interference combinations. As for how the interference combinations are realized, note that the signal transmitted by a given transmission point 24 on a given IMR 40 can be one of two types: either the signal is a non-data signal, i.e., no UE 28 is expected to decode the signal or otherwise extract binary information from it, or the signal is a regular data transmission targeted to a UE 28 that has not been configured to measure interference on the IMR 40. In one embodiment, all signals that are transmitted on the IMRs 40 are of the non-data type. However, in one or more other embodiments contemplated herein, regular data transmissions are mapped onto the IMRs 40. In these embodiments, non-data transmissions have to be used as a complement for situations when a given transmission point is required to transmit a signal on an IMR 40 and there is no regular data available for downlink transmission.

The non-data transmission could in general be an arbitrary signal, typically with a power profile that is similar to a regular data transmission. In one embodiment, the non-data signal is a spatially isotropic signal, where uncorrelated subsignals are transmitted with the same power on all virtual antenna ports within the transmission point 24. The benefit of using isotropic signaling on the IMRs 40 is that it excites all spatial directions in the transmission point 24 and will result in more constant interference measurements.

Further teachings herein relate to pruning the list of possible IMRs 40. In such embodiments, for a set of CoMP transmission points 24, the network 20 does not configure possible combinations of distinct IMRs 40. For instance, consider a case involving six transmission points 24 operating as a CoMP set, where the six transmission points 24 within a six sector intra-site are to be coordinated. In other words, the coordination cluster is formed as containing six transmission points 24 (TP1, TP2, TP3, TP4, TP5, and TP6), which transmission points 24 are ordered by traversing the sectors clockwise one lap around the site, so that if a UE moves clockwise around the site on a circular-shaped trajectory with an appropriate radius, the sequence of its strongest transmission points 24 will follow the order given above, and where TP6 is followed by TP1.

Now, assume that a given one of these transmission points 24 is a primary or serving transmission point 24 relative to a given UE 28. One may assume that transmissions to other UEs 28 by the two neighboring transmission points 24 will dominate any interference seen by the UE 28. Now, consider the example where the maximum possible number of $2^6-1$ of IMRs 40 is reduced to a count of nine, as shown in FIG. 11. Note that for each transmission point 24 at issue in the table of FIG. 11, it is possible to find four distinct IMRs 40 that all have different interference patterns for the neighboring transmission points 24.

This example can be generalized to other types of CoMP clusters, where the clusters have the inherent property that certain transmission points 24 are closer to a given UE 28 in terms of radio distance than other transmission points 24. The principle is that two transmission points 24 that are far apart from a radio perspective, as seen from the UEs 28, should not need specific IMRs 40 to handle the mutual coordination. Examples of such deployments include heterogeneous network deployments, where the low-power transmission points 24 can be regarded as mutually far apart in radio distance.

In another example, consider coordination among nine transmission points 24 over three sites in a hexagonal three-sector macro deployment. One sees an example of this arrangement in FIG. 12, which includes sectors/cells 22-1 through 22-9, with the nine transmission points 24 indicated via the arrows shown in the diagram. These transmission points 24 can be grouped into four groups 1, 2, 3 and 4, with the groups being mutually far apart in radio distance. That is, the sectors/cells 22 within each group are separated by at least one cell radius.

In a refinement of the above embodiment, the sub-selection of all combinations of distinct IMRs 40 is done, at least in part, by analyzing prior measurements from within the set of CoMP transmission points 24, such as historically reported RSRP measurements from UEs 28, which may or may not still be active. The principle remains the same; namely, two transmission points 24 that are far apart from a radio perspective, as seen from the UEs 28, should not need specific IMRs 40 to handle the mutual coordination.

More generally, it is recognized herein that, if two transmission points 24 within a CoMP set are far apart in terms of perceived radio distance, there is no need for those transmission points 24 to use specific IMRs 40 to capture the effects of coordination between the two transmission points 24. For example, it is contemplated to apply the teachings herein to the case where the network 20 contains a number of low-power transmission points 24. The UEs 28 that are connected to the low-power transmission points 24 typically have macro sectors/transmission points 24 as their dominating interferers. That is, other low-power transmission points 24 will have less impact than the one or more high-power transmission points 24 that provide macro sector coverage within the same areas of the low-power transmission points 24.

Consider the example where a coordination cluster involves two macro sectors, which further include eight low-power transmission points 24. The higher-power macro sector transmissions generally will represent the two dominant sources of interference in many realistic deployments, for most of the UEs 28 that are connected to one of the low-power transmission points 24. This situation and similar circumstances are addressed by way of example according to the table shown in FIG. 13. The table assumes two macro or high-power transmission points 24 and eight pico or low-power transmission points 24.

However, according to this example, instead of using the exhaustive set of $2^{10}-1=1023$ IMRs 40, the table illustrates that seven distinct combinations have been formed, based on treating the two macro transmission points 24, TP1 and TP2, individually, while treating the low-power transmission points 24 as a consolidated group acting in the same way for each distinct combination of TP1, TP2 behavior.

One conditional variable 42 may be maintained for the entire group of TP3-TP10, or individual control variables 42 may be maintained for all of them and collectively set to the first state or to the second state. In one embodiment, the control variable(s) 42 maintained for the group of TP3-TP10 for a given one or more IMRs 40 is/are set to the first state if any of the transmission points 24 in the group meet any of the parameters described earlier herein for deciding whether a given transmission point 24 should be deemed as being likely to transmit data at a time relevant to one or more given IMRs 40, or should be deemed as being not likely to transmit data at the relevant time.

With the above in mind, it will be appreciated that the teachings herein provide numerous advantages over known approaches to constructing the interference composition on any one or more IMRs 40, where the approach taught herein preserves the UE-specific priority among IMRs 40, and makes the interference patterns represented by the IMRs 40 invariant to changes in loading, thereby maximizing the usefulness of CSI reporting on different IMRs 40. Thus, the teachings herein avoid the need for reconfiguring the CSI reporting of UEs 28 operating within a CoMP set in dependence on changing loading. Because reconfiguration consumes time, imposes a delay before taking effect, and consumes resources, particularly in the UEs 28, the teachings presented herein make CoMP operation faster and less costly, i.e., more efficient.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a node in a wireless communication network that is configured for Coordinated Multi-Point (CoMP)

operation, said method comprising configuring one or more transmission points in a set of CoMP transmission points on a dynamic basis, with respect to one or more defined Interference Measurement Resources (IMRs), including configuring a first transmission point to follow a first rule according to which the first transmission point:

transmits on at least one of the IMRs, if the first transmission point is deemed as being not likely to transmit data at a time relevant to the at least one IMR; and does not transmit on the at least one IMR, if the first transmission point is deemed as being likely to transmit data at a time relevant to the at least one IMR.

2. The method of claim 1, wherein configuring the one or more transmission points further comprises configuring a second transmission point to follow a second rule according to which the second transmission point:

transmits on at least one of the IMRs, if the second transmission point is deemed as being likely to transmit data at a time relevant to the at least one IMR; and does not transmit on the at least one IMR, if the second transmission point is deemed as being not likely to transmit data at a time relevant to the at least one IMR.

3. The method of claim 2, wherein the first and second transmission points comprise:

the same transmission point taken at different times, or taken with respect to different ones of the IMRs; or different transmission points configured with respect to the same at least one IMR.

4. The method of claim 1, further comprising maintaining one or more control variables, where each control variable indicates whether a corresponding one or ones of the transmission points is deemed as being likely or not likely to transmit data at a time relevant to a respective one or ones of the IMRs, including for each control variable, dynamically setting the control variable to:

a first state if the corresponding one or ones of the transmission points is deemed as being likely to transmit data at a time relevant to the respective one or ones of the IMRs; or a second state if the corresponding one or ones of the transmission points is deemed as being likely to transmit data at a time relevant to the respective one or ones of the IMRs, wherein the first and second states are complementary.

5. The method of claim 4, further comprising determining whether any given transmission point is deemed as being likely or not likely to transmit data at a time relevant to any given IMR, based on reading the value of the control variable maintained with respect to the given IMR and the given transmission point.

6. The method of claim 1, wherein the configuring step comprises:

for at least one of the IMRs, logically dividing the set of CoMP transmission points into first and second subsets;

where each transmission point in the first subset is configured to transmit or not transmit on the IMR according to the first rule; and where each transmission point in the second subset is configured to transmit or not transmit on the IMR according to the second rule.

7. The method of claim 1, further comprising, for any given transmission point in the set of CoMP transmission points:

deeming the transmission point as being likely to transmit data at a time relevant to a given IMR based on the fulfilment of a set of any one or more of the following traffic activity and/or loading conditions:

determining that downlink data is transmitted from the transmission point on relevant frequencies;

determining that there is data in a downlink transmission buffer of the transmission point;

determining that the transmission point is serving as a primary transmission point for one or more active wireless devices operating in the wireless communication network; and determining that a loading level of the transmission point is above a defined upper loading threshold; and otherwise, when the set of any one or more of the traffic activity and/or loading conditions is not fulfilled, deeming the transmission point as being not likely to transmit data at the time relevant to the given IMR.

8. The method of claim 7, further comprising setting a corresponding control variable to a first state if the transmission point to indicate that the transmission point is deemed as being likely to transmit data at the time relevant to the given IMR, or setting the corresponding control variable to a second state to indicate that the transmission point is deemed as being not likely to transmit data at the time relevant to the given IMR, wherein the first and second states are complementary.

9. The method of claim 8, further comprising performing said steps of deeming and setting on a repeating basis, so that whether a given transmission point is deemed as being likely or not likely to transmit data at a time relevant to a given IMR changes as a function of changing conditions at the transmission point and/or in the wireless communication network, and so that the deemed state of the given transmission point for the given IMR changes according to the changing conditions.

10. The method of claim 1, further comprising deeming any given transmission point in the set of CoMP transmission points as being likely to transmit data at a time relevant to a given one of the IMRs if there is a possibility of such a data transmission from the given transmission point, and otherwise deeming the given transmission point as being not likely to transmit data at a time relevant to the given IMR.

11. The method of claim 1, further comprising configuring a wireless device supported by one or more of the transmission points in the set of CoMP transmission points to feed back a Channel State Information (CSI) report based on measuring interference on the at least one IMR.

12. The method of claim 11, wherein the CSI report is configured to use a rank indicator (RI) and/or precoder matrix indicator (PMI) that is equal to the respective RI and/or PMI from another CSI report that the wireless device is configured to feed back.

13. The method of claim 1, further comprising performing the step of configuring on a group-wise basis, so that a group of transmission points from the CoMP set of transmission points act collectively with respect to the at least one IMR and either all transmit on the at least one IMR or all do not transmit on the at least one IMR, based on configuring the group to follow the second rule, wherein:

all transmission points in the group transmit on the at least one IMR, if any of the transmission points in the group is deemed as being likely to transmit data at a time relevant to the at least one IMR; or none of the transmission points in the group transmit on the at least one IMR, if all of the transmission points in the group are deemed as being not likely to transmit data at a time relevant to the at least one IMR.

14. A node in a wireless communication network that is configured for Coordinated Multi-Point (CoMP) operation, said node comprising:

a communication interface configured for communicating with transmission points in a set of CoMP transmission points; and one or more processing circuits operatively associated with the communication interface and configured to configure one or more of the transmission points on a dynamic basis, with respect to one or more defined Interference Measurement Resources (IMRs) including configuring a first transmission point to follow a first rule according to which the first transmission point:

transmits on at least one of the IMRs, if the first transmission point is deemed as being not likely to transmit data at a time relevant to the at least one IMR; and does not transmit on the at least one IMR, if the first transmission point is deemed as being likely to transmit data at a time relevant to the at least one IMR.

15. The node of claim 14, wherein the one or more processing circuits are further configured to configure a second transmission point to follow a second rule according to which the second transmission point:

transmits on at least one of the IMRs, if the second transmission point is deemed as being likely to transmit data at a time relevant to the at least one IMR; and does not transmit on the at least one IMR, if the second transmission point is deemed as being not likely to transmit data at a time relevant to the at least one IMR.

16. The node of claim 15, wherein the first and second transmission points comprise:

the same transmission point taken at different times, or taken with respect to different ones of the IMRs; or different transmission points configured with respect to the same at least one IMR.

17. The node of claim 14, wherein the one or more processing circuits are configured to maintain one or more control variables, where each control variable indicates whether a corresponding one or ones of the transmission points is deemed as being likely or not likely to transmit data at a time relevant to a respective one or ones of the IMRs, based on being configured to, for each control variable, dynamically set the control variable to:

a first state if the corresponding one or ones of the transmission points is deemed as being likely to transmit data at a time relevant to the respective one or ones of the IMRs; or a second state if the corresponding one or ones of the transmission points is deemed as being likely to transmit data at a time relevant to the respective one or ones of the IMRs, wherein the first and second states are complementary.

18. The node of claim 17, wherein the one or more processing circuits are configured to determine whether any given transmission point is deemed as being likely or not likely to transmit data at a time relevant to any given IMR, based on reading the value of the control variable maintained with respect to the given IMR and the given transmission point.

19. The node of claim 14, wherein the one or more processing circuits are configured to:

for at least one of the IMRs, logically divide the set of CoMP transmission points into first and second subsets;

where each transmission point in the first subset is configured to transmit or not transmit on the IMR according to the second rule; and where each transmission point in the second subset is configured to transmit or not transmit on the IMR according to the first rule.

20. The node of claim 14, wherein, for any given transmission point in the set of CoMP transmission points, the one or more processing circuits are configured to perform a deeming operation in which the one or more processing circuits:

deem the transmission point as being likely to transmit data at a time relevant to a given IMR based on the fulfilment of a set of any one or more of the following traffic activity and/or loading conditions:

determining that downlink data is transmitted from the transmission point on relevant frequencies;

determining that there is data in a downlink transmission buffer of the transmission point;

determining that the transmission point is serving as a primary transmission point for one or more active wireless devices operating in the wireless communication network; and determining that a loading level of the transmission point is above a defined upper loading threshold; and otherwise, when the set of any one or more of the traffic activity and/or loading conditions is not fulfilled, deem the transmission point as being not likely to transmit data at the time relevant to the given IMR.

21. The node of claim 20, wherein the one or more processing circuits are configured to perform the deeming operation on a repeating basis, so that the status of the transmission point as being deemed likely or not likely to transmit data at the time relevant to the given IMR changes dynamically with changes in loading at the transmission point and/or within the wireless communication network.

22. The node of claim 14, wherein the one or more processing circuits are configured to deem any given transmission point in the set of CoMP transmission points as being likely to transmit data at a time relevant to a given one of the IMRs, if there is a possibility of such a data transmission from the given transmission point, and otherwise to deem the given transmission point as being not likely to transmit data at a time relevant to the given IMR.

23. The node of claim 14, wherein the one or more processing circuits are configured to configure a wireless device supported by one or more of the transmission points in the set of CoMP transmission points to feed back a Channel State Information (CSI) report based on measuring interference on the at least one IMR.

24. The node of claim 23, wherein the CSI report is configured to use a rank indicator (RI) and/or precoder matrix indicator (PMI) that is equal to the respective RI and/or PMI from another CSI report that the wireless device is configured to feed back.

25. The node of claim 14, wherein the one or more processing circuits are configured to configure the transmission points in the set of CoMP transmission points on a group-wise basis so that a group of transmission points from the CoMP set of transmission points act collectively with respect to the at least one IMR and either all transmit on the at least one IMR or all do not transmit on the at least one IMR, based on configuring the group to follow the second rule, wherein:

all transmission points in the group transmit on the at least one IMR, if any of the transmission points in the group is deemed as being likely to transmit data at a time relevant to the at least one IMR; or none of the transmission points in the group transmit on the at least one IMR, if all of the transmission points in the group are deemed as being not likely to transmit data at a time relevant to the at least one IMR.

* * * * *